United States Patent
Chikaoka et al.

(10) Patent No.: US 9,454,264 B2
(45) Date of Patent: Sep. 27, 2016

(54) MANIPULATION INPUT DEVICE, MANIPULATION INPUT SYSTEM, AND MANIPULATION INPUT METHOD

(71) Applicant: Funai Electric Co., Ltd., Daito, Osaka (JP)

(72) Inventors: Atsuhiko Chikaoka, Osaka (JP); Ken Nishioka, Osaka (JP); Shintaro Izukawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/280,961

(22) Filed: May 19, 2014

(65) Prior Publication Data
US 2014/0354599 A1 Dec. 4, 2014

(30) Foreign Application Priority Data

Jun. 4, 2013 (JP) ................................. 2013-118130

(51) Int. Cl.
*G06F 3/042* (2006.01)
*G06F 3/0354* (2013.01)

(52) U.S. Cl.
CPC ......... *G06F 3/0425* (2013.01); *G06F 3/03545* (2013.01); *G06F 3/0426* (2013.01)

(58) Field of Classification Search
None
See application file for complete search history.

(56) References Cited

U.S. PATENT DOCUMENTS

| | | | | |
|---|---|---|---|---|
| 2005/0107979 A1* | 5/2005 | Buermann | .......... | G06F 3/03545 702/154 |
| 2009/0167726 A1* | 7/2009 | Sprague | .............. | G06F 3/03542 345/179 |
| 2010/0181121 A1 | 7/2010 | Tremblay | | |
| 2010/0253618 A1* | 10/2010 | Nishigaki | ............. | G06F 3/0423 345/156 |
| 2012/0249482 A1 | 10/2012 | Kiyose | | |
| 2013/0088465 A1* | 4/2013 | Geller | ................ | G06F 3/03545 345/179 |
| 2013/0314380 A1* | 11/2013 | Kuribayashi | ......... | G06F 3/0425 345/175 |

FOREIGN PATENT DOCUMENTS

JP 2012-026936 A 2/2012

OTHER PUBLICATIONS

Extended European Search Report of the corresponding European Application No. 14170153.2, dated Oct. 23, 2014.

* cited by examiner

*Primary Examiner* — Jason Olson
*Assistant Examiner* — Krishna Neupane
(74) *Attorney, Agent, or Firm* — Global IP Counselors, LLP

(57) ABSTRACT

A manipulation input device includes a projection component, a photodetector and an inclination determination component. The projection component projects an image on a projection surface by scanning light from a light source. The photodetector detects as scattered light the light reflected by a manipulation object. The inclination determination component acquires, for a plurality of scan lines of the light, position information of the manipulation object that is specified based on scanning angle information when the photodetector has detected the scattered light, and width information of the manipulation object that corresponds to a continuous detection duration during which the photodetector continuously detects the scattered light. The inclination determination component determines inclination of the manipulation object based on at least one of a temporal change in a plurality of sets of the width information and a temporal change in a plurality of sets of the position information.

10 Claims, 9 Drawing Sheets

MANIPULATION INPUT DEVICE, MANIPULATION INPUT SYSTEM, AND MANIPULATION INPUT METHOD

CROSS-REFERENCE TO RELATED APPLICATIONS

This application claims priority to Japanese Patent Application No. 2013-118130 filed on Jun. 4, 2013. The entire disclosure of Japanese Patent Application No. 2013-118130 is hereby incorporated herein by reference.

BACKGROUND

1. Field of the Invention

The present invention generally relates to a manipulation input device and a manipulation input method. More specifically, the present invention relates to a manipulation input device and a manipulation input method for executing input by user manipulation on a projected screen.

2. Background Information

Conventionally, a sensor device is well known in the art that detects the coordinates of an object used for manipulation input by using a scanning light beam that produced a projected image (see Japanese Unexamined Patent Application Publication No. 2012-026936 (Patent Literature 1), for example). With the sensor device in Patent Literature 1, first a light beam emitted from a light source is scanned vertically and horizontally by a deflector and thereby projected on an irradiated surface. When a manipulation object moves into a detection space that includes the irradiated surface, a photodetector receives the light beam reflected by the manipulation object, and generates a light reception signal. This sensor device outputs a timing signal at a timing corresponding to discrete scanning points of the light beam on the irradiated surface. The sensor device recognizes an object by determining the coordinates of the manipulation object on the irradiated surface based on the timing signal and the output of the photodetector.

That is, the sensor device in Patent Literature 1 is configured to allow reflected light from the manipulation object to be received by the photodetector. Thus, the light reception signal of the photodetector is monitored to detect that the manipulation object has moved into a detection space, and the detection position is determined from this and from the above-mentioned timing signal. This makes possible user input manipulation corresponding to the specified detection position.

SUMMARY

With the sensor device in accordance with Patent Literature 1, it has been discovered that since the light beam is scanned within the detection space, a position that is away from the distal end of the manipulation object can be detected. For example, if the user holds the manipulation object at an angle, there will be an error between the detected position and the position of the distal end, which is the actual designated coordinates, due to the tilted manipulation object. Accordingly, this creates problems such as a loss of manipulation convenience due to the fact that the pointer on the irradiated surface does not coincide with the detection position. This problem can be dealt with by detecting the distal end using a calibration function, detecting the inclination of a manipulation object using a plurality of light receiving elements, etc. However, this makes user manipulation and device configuration more complicated.

One aspect is to provide a manipulation input device, a manipulation input system, and a manipulation input method with which user manipulation convenience are ensured with a simplified device configuration while user input manipulation can be accurately detected.

In view of the state of the known technology, a manipulation input device is provided that includes a projection component, a photodetector and an inclination determination component. The projection component is configured to project an image on a projection surface by scanning light from a light source. The photodetector is configured to detect as scattered light the light reflected by a manipulation object that has moved into a specific detection range including the projection surface. The inclination determination component is configured to acquire, for a plurality of scan lines of the light, position information of the manipulation object that is specified based on scanning angle information when the photodetector has detected the scattered light, and width information of the manipulation object that corresponds to a continuous detection duration during which the photodetector continuously detects the scattered light, the inclination determination component being further configured to determine inclination of the manipulation object based on at least one of a temporal change in a plurality of sets of the width information and a temporal change in a plurality of sets of the position information.

Also other objects, features, aspects and advantages of the present disclosure will become apparent to those skilled in the art from the following detailed description, which, taken in conjunction with the annexed drawings, discloses one embodiment of the manipulation input device, the manipulation input system, and the manipulation input method.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Specifically, the numerical values, shapes, materials, constituent elements, layout positions and connection mode of the constituent elements, steps, the order of steps and so forth described in the following embodiments are provided all just for illustration only and not for the purpose of limiting the invention. The invention is merely defined by the appended claims. Of the constituent elements in the following embodiments, those not discussed in an independent claim are not necessarily required, but will be described for understanding of the embodiments.

First Embodiment

Basic Configuration of Manipulation Input Device

Figure 1:
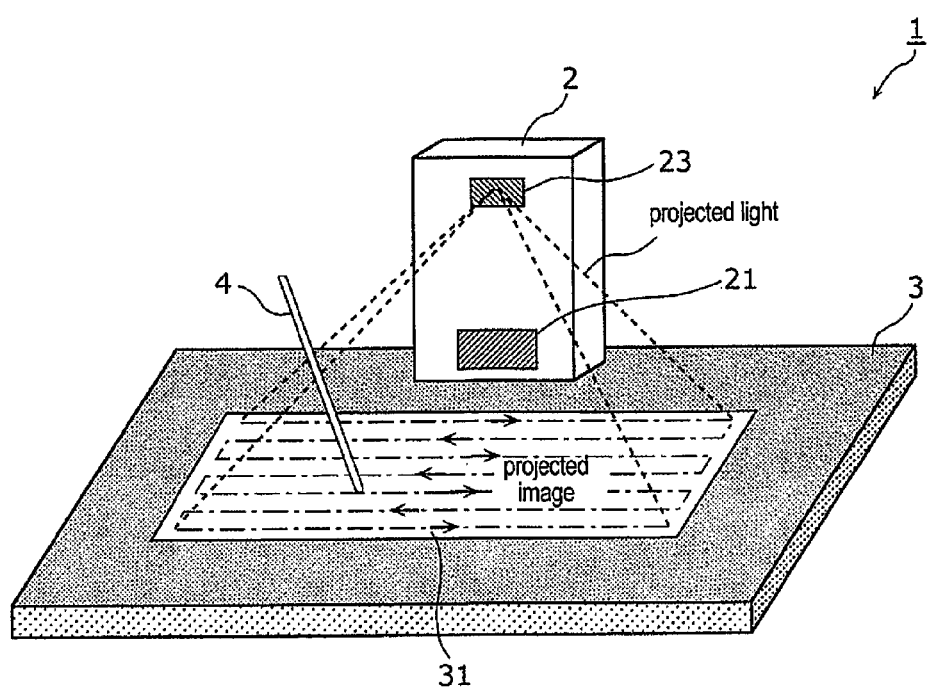
FIG. 1 is a perspective view of a manipulation input system in accordance with a first embodiment.

Referring initially to FIG. 1, a manipulation input system 1 is illustrated in accordance with a first embodiment. FIG. 1 is a simplified diagram of the configuration of the manipulation input system in accordance with a first embodiment. The manipulation input system 1 in accordance with this embodiment basically includes a manipulation input device 2, a manipulation display board 3, and a manipulation pen 4 (e.g., a manipulation object).

The manipulation input device 2 emits projected light, scanning it horizontally and vertically, from a projection opening 23 toward a projection area 31 (e.g., a projection surface) disposed on the surface of the manipulation display board 3. Consequently, a manipulation input-use image is projected in the projection area 31.

The user looks at the projected image on the projection area 31, and designates a position on the projection area 31 with a rod-shaped manipulation object, such as the manipulation pen 4 or a finger, relative to the projected image. In the illustrated embodiment, the manipulation pen 4 is used as the manipulation object.

The manipulation input device 2 uses a light receiver 21 to detect projected light that has been reflected or scattered by the manipulation pen 4 (hereinafter referred to collectively as scattered light). The light receiver 21 recognizes the position of the manipulation pen 4 based on the above-mentioned detection result and the scanning state of the projected light beam, and specifies the coordinates of the manipulation pen 4 on the projection area 31 for each of a plurality of scan lines of the projected light beam. The light receiver 21 also calculates the detection width of the manipulation pen 4 for each of the plurality of scan lines, and calculates the inclination of the manipulation pen 4 based on a temporal change in these detection widths. An opening region is provided to the light receiver 21 so that the light receiver 21 will be able to detect the scattered light from the manipulation pen 4 located in the projection area 31.

The manipulation input device 2 is a projector that measures position information and inclination information about the manipulation pen 4 and designates the display content outputted to the projection area 31, which is the projection surface, or the control content of a computer (not shown) that is connected to the manipulation input device 2.

Figure 2:
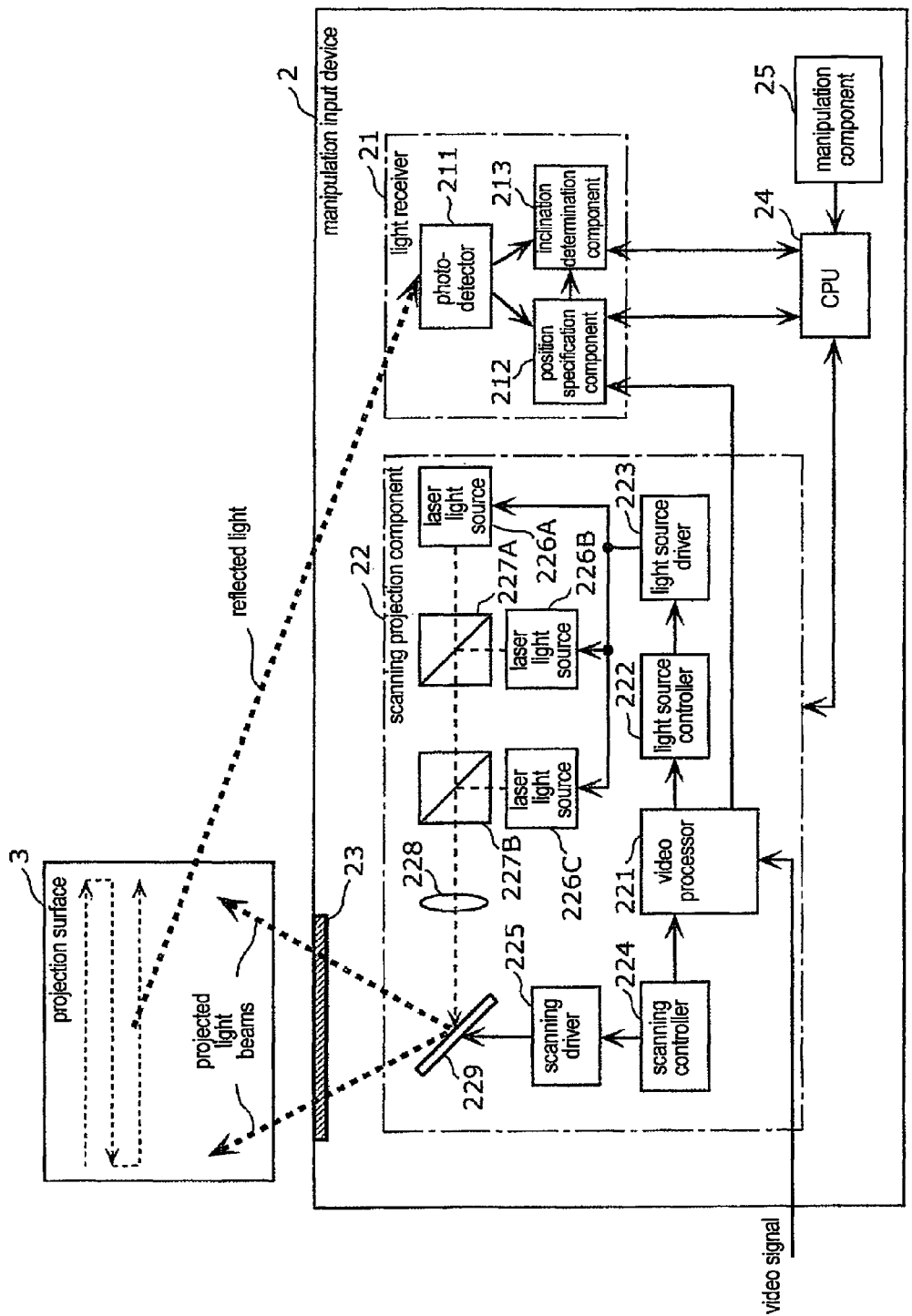
FIG. 2 is a block diagram of the manipulation input system illustrated in FIG. 1.

FIG. 2 is a block diagram of the manipulation input system 1. In this embodiment, the manipulation input device 2 that is part of the manipulation input system 1 includes the light receiver 21, a scanning projection component 22, the projection opening 23, a CPU 24, and a manipulation component 25. The constituent elements of the manipulation input device 2 will now be described.

The scanning projection component 22 is a projector that makes use of the laser scanning method, and includes a laser beam generator and a driver controller. The laser beam outputted by the laser beam generator is alternately scanned in the main scanning direction (horizontally), which is perpendicular to the projection direction of the laser beam, and the sub-scanning direction (vertically), which is perpendicular to the main scanning direction, to project an image on the surface of the projection area 31. The laser beam generator, for example, includes three laser light sources 226A, 226B, and 226C, dichroic mirrors 227A and 227B, and a lens 228, and generates a laser beam that corresponds to image information for use in image formation in the projection area 31.

The laser light sources 226A to 226C are laser diodes (LDs) that output laser beams with mutually different color components, and are driven independently of each other by drive current supplied individually from a light source driver 223, thereby outputting laser beams of monochromatic components. Consequently, monochromatic component laser beams of specific wavelengths are emitted, such as a red component (R) from the laser light source 226A, a green component (G) from the laser light source 226B, and a blue component (B) from the laser light source 226C.

The dichroic mirrors 227A and 227B transmit only laser light of a specific wavelength, and reflect the rest, which combines the laser beams of the various color components emitted from the laser light sources 226A to 226C. More specifically, laser beams of red and green components emitted from the laser light sources 226A and 226B are combined at the dichroic mirror 227A on the upstream side of the optical path, and the resulting beam is emitted to the dichroic mirror 227B on the downstream side of the optical path. The combined beam thus emitted is further combined with the laser beam of the blue component emitted from the laser light source 226C at the dichroic mirror 227B, and is emitted at a scanning mirror 229 as the final, targeted color light.

The scanning mirror 229 deflects and scans the laser beam combined at the above-mentioned laser beam generator, and thereby projects an image in the projection area 31 on the manipulation display board 3. A MEMS (micro-electro-mechanical system) type of scanning mirror, which is advantageous in terms of small size, low power consumption, and faster processing, for example, is used as the scanning mirror 229. The scanning mirror 229 is scanned and displaced in the horizontal direction (X) and the vertical direction (Y) by a scanning driver 225 to which drive signals are inputted from a scanning controller 224.

A video processor 221 sends video data to a light source controller 222 at regular time intervals based on video signals inputted from the outside (such as a personal computer). As a result, the light source controller 222 obtains pixel information at a specific scanning position. The video processor 221 also sends scanning angle information, that is, information about the scanning position of projected light at a certain time, to the light receiver 21.

The light source controller 222 controls the light source driver 223 with drive current waveform signals in order to project video formed of a plurality of pixels in a projection range based on the above-mentioned pixel information.

The light source driver 223 generates light by driving the laser light sources 226A to 226C under control by the light source controller 222. The laser light sources 226A to 226C generate and output laser beams when current is supplied at or above an oscillation threshold current value from the light source driver 223, and output laser beams whose output (light quantity) increases in proportion to the amount of current being supplied. The laser light sources 226A to 226C stop outputting laser beams when current below the oscillation threshold current value is supplied.

The light receiver 21 includes a photodetector 211, a position specification component 212, and an inclination determination component 213.

The photodetector 211 detects scattered light from the manipulation pen 4 that has moved into the detection space (this light coming from the projected light beam scanned by the scanning projection component 22), and sends a detection signal indicating the detection to the position specification component 212 and the inclination determination component 213.

When the above-mentioned detection signal is received from the photodetector 211, the position specification component 212 specifies the scanning position in the projection area 31 of the projected light beam at the point of detection of the manipulation pen 4 that has moved into the detection space based on the scanning angle information received from the video processor 221.

The inclination determination component 213 acquires, for a plurality of scan lines of the projected light beam, the continuous detection duration during which the photodetector 211 continuously detects the scattered light while the scanning projection component 22 is scanning in the main scanning direction (horizontally), based on the detection signal of the photodetector 211. The inclination determination component 213 calculates, as the detection width of the manipulation pen 4, the scanning interval in the projection area 31 corresponding to the continuous detection duration, from the continuous detection duration and the scanning rate or speed at which the projected light beam is scanned. The inclination determination component 213 calculates the above-mentioned detection width for each of the plurality of scan lines. The inclination determination component 213 also acquires the above-mentioned scanning position of the manipulation pen 4 specified by the position specification component 212, for each of the plurality of scan lines. The inclination determination component 213 then determines the inclination of the manipulation pen 4 based on a temporal change in the plurality of detection widths and/or a temporal change in the scanning positions. In other words, the inclination determination component 213 acquires the width and the scanning position at each portion of the manipulation pen 4 in the main scanning direction when the manipulation pen 4 is detected, and calculates the inclination of the manipulation pen 4 based on the change in the plurality of acquired widths and scanning positions.

The CPU 24 is a processor that gives instructions to the drive controller of the scanning projection component 22. The CPU 24 has a memory that holds data for controlling the scanning state of the scanning mirror 229, etc.

The manipulation component 25 accepts manipulation to switch on the power supply of the manipulation input device 2, manipulation to change the angle of projection of image information, manipulation to change the resolution of the projected image, and so on.

The manipulation input device 2 executes the above-mentioned control content or displays the above-mentioned display content based on the inclination of the manipulation pen 4 determined by the inclination determination component 213. In the illustrated embodiment, executing of the control content or displaying the display content is an example of a manipulation event of the present invention.

Calculation Principle of Manipulation Input Device

The principle by which the manipulation input device 2 specifies the inclination of the manipulation object will now be described.

Figure 3:
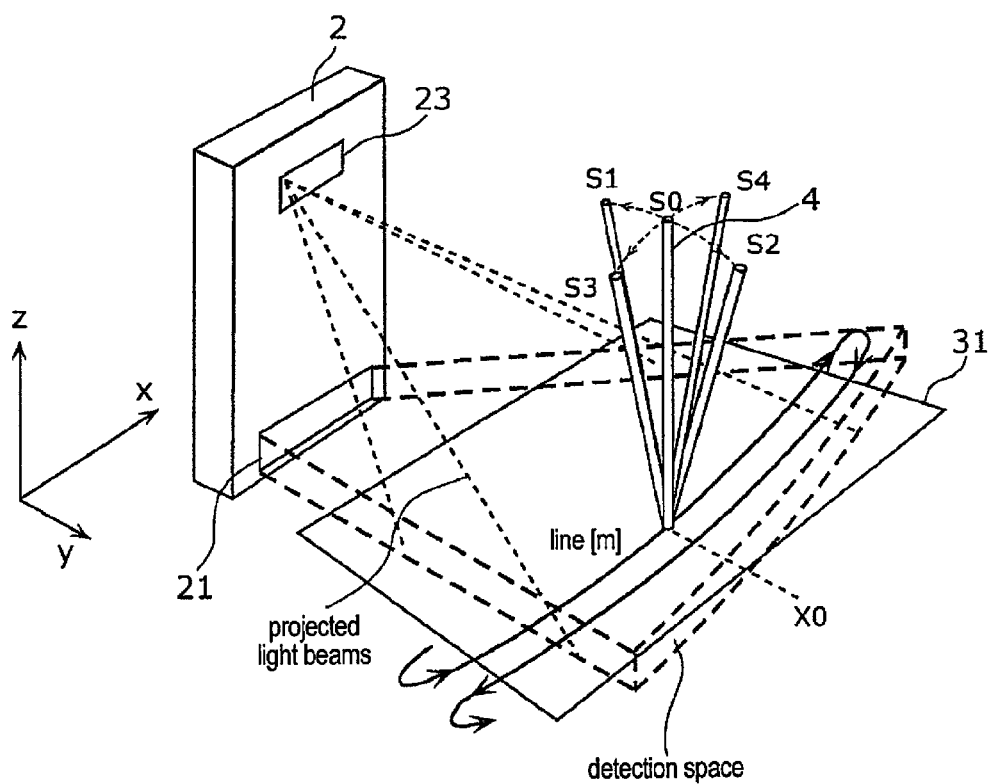
FIG. 3 is a perspective view of the manipulation input system, illustrating an inclination direction of a manipulation pen, a detection space, and a scanning range of a manipulation input device of the manipulation input system.

FIG. 3 is a perspective view of the manipulation input system 1, illustrating the inclination direction of the manipulation pen 4, the detection space, and the scanning range of the manipulation input device 2. The projected light beam emitted from the scanning projection component 22 through the projection opening 23 displays the projected image in the projection area 31 by scanning over the projection area 31. The light receiver 21 also detects the scattered light from the manipulation pen 4 when the manipulation pen 4 has moved into the detection space, which is a light detection range (e.g., a specific detection range) of the light receiver 21 that is limited to within a predetermined range in a direction perpendicular to the projection area 31.

In the states S0 to S4 of the manipulation pen 4, the distal end of the manipulation pen 4 indicates substantially the same point in the projection area 31, while the inclination of the manipulation pen 4 is different in each state. The state S0 is a state in which the manipulation pen 4 is pointed in the normal direction of the surface of the projection area 31. The states S1 and S2 are states in which the manipulation pen 4 has been inclined from the state S0 in the negative direction of the Y axis (a direction moving toward the light source O (see FIG. 4)) and the positive direction (a direction moving away from the light source O), respectively. The states S3 and S4 are states in which the manipulation pen 4 has been inclined from the state S0 in the negative direction of the X axis (the negative horizontal scanning direction at line m) and the positive direction (the positive horizontal scanning direction at line m), respectively. The manipulation input device 2 in accordance with this embodiment detects this state change and produces manipulation input that reflects this detection result. In the illustrated embodiment, for example, the light source O as a reference point is defined by a light emitting or reflecting point on the scanning mirror 229 that deflects and scans the laser beam. However, the light source O can be differently defined as needed and/or desired.

FIG. 3 illustrates a state in which the manipulation pen 4 is inclined only in either the X axis direction or the Y axis direction. However, the inclination can be in a mixture of both axial directions.

Figure 4:
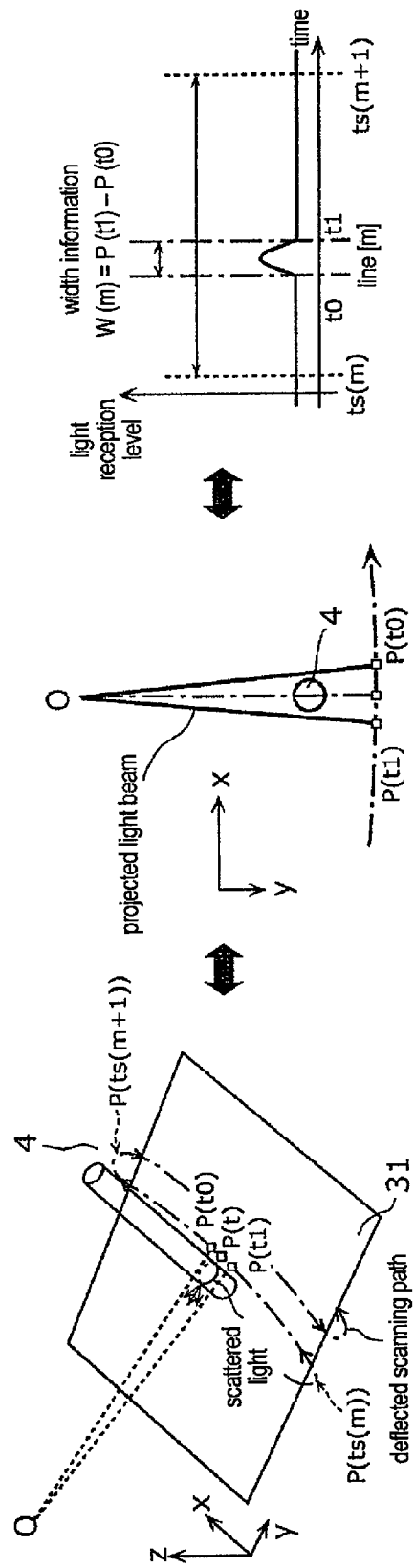
FIG. 4 is a schematic diagram illustrating the principle behind detecting a detection width of a manipulation object in a main scanning direction.

FIG. 4 is a schematic diagram illustrating the principle behind detecting the detection width of the manipulation pen 4 in the main scanning direction. As shown on the left side in FIG. 4, the manipulation pen 4 is detected in the interval while the projected light beam is being scanned horizontally between the starting point P(ts(m)) of the m-th horizontal scan (in the main scanning direction) and the starting point P(ts(m+1)) of the (m+1)-th horizontal scan. P(t) is a function expressing the scanning angle at time t. At this point, the scattered light is detected in the scanning interval between P(t0) and P(t1), as best shown in the middle and on the right side in FIG. 4. The scanning interval of P(t0) to P(t1) here is the interval in which the scanning light beam crosses the manipulation pen 4 while the scanning projection component 22 is scanning horizontally, and is the detection width W(m) at which the photodetector 211 continuously detects the scattered light from the manipulation pen 4. Next, the principle will be described by which the manipulation input device 2 acquires the inclination information about the manipulation pen 4 by using the above-mentioned detection principle for the detection width.

Figure 5A:
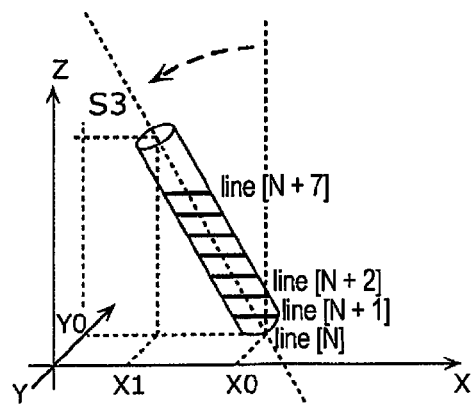
FIG. 5A is a diagram illustrating a state when a plurality of detection widths of the manipulation pen are detected in a state S3.
Figure 5B:
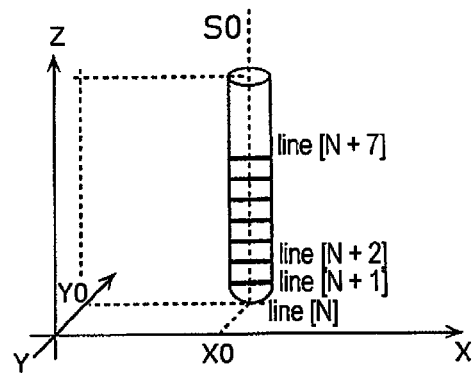
FIG. 5B is a diagram illustrating a state when a plurality of detection widths of the manipulation pen are detected in a state S0.
Figure 5C:
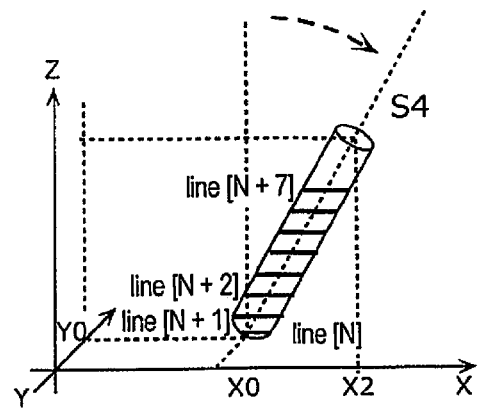
FIG. 5C is a diagram illustrating a state when a plurality of detection widths of the manipulation pen are detected in a state S4.

FIG. 5A is a diagram illustrating a state when the plurality of detection widths of the manipulation pen 4 are detected in the state S3. FIG. 5B is a diagram illustrating a state when the plurality of detection widths of the manipulation pen 4 are detected in the state S0. FIG. 5C is a diagram illustrating a state when the plurality of detection widths of the manipulation pen 4 are detected in the state S4. FIGS. 5A to 5C are views of the manipulation pen 4 from the light source O side, and illustrate how the scan lines [N] to [N+7] cross the manipulation pen 4 in a plurality of main scanning directions (horizontal directions).

As shown in FIGS. 5A to 5C, the continuous detection duration during which the photodetector 211 continuously detects the scattered light changes according to the inclination of the manipulation pen 4 in the X axis direction. Furthermore, the X coordinate detection positions (i.e., the scanning angles) at which the scan lines pass through the manipulation pen 4 change, respectively.

Figure 5D:
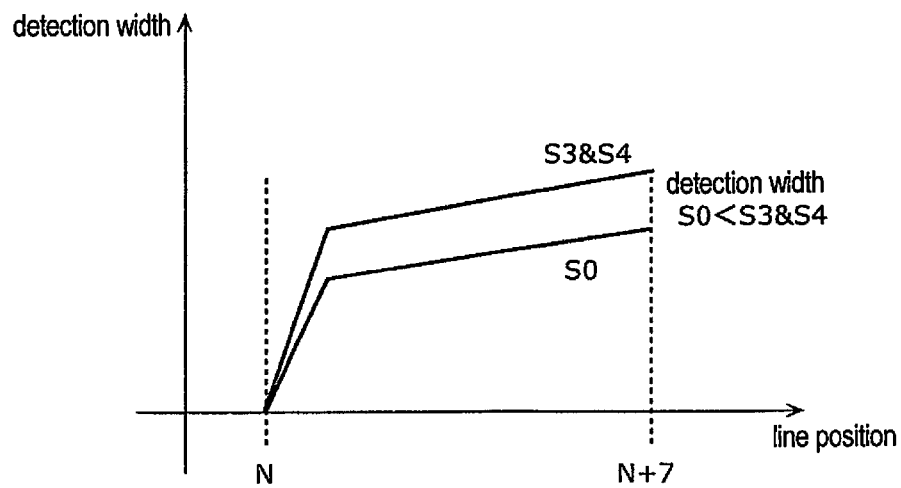
FIG. 5D is a graph illustrating changes in the detection widths in the states S0, S3, and S4.

FIG. 5D is a graph illustrating the changes in the detection widths in states S0, S3, and S4. In this graph, the horizontal axis indicates the position of the scan lines (e.g., line number), and the vertical axis indicates the detection width. In the illustrated embodiment, the manipulation pen 4 can have a shape that is pointed at the distal end, rather than being uniformly cylindrical. In this case, as shown in the graph in FIG. 5D, sharp inclination near the scan line [N] indicates a sudden change in the detection width from the distal end of the manipulation pen 4 to the main cylindrical part.

Meanwhile, from near the scan line [N+1] to [N+7], the states S0, S3, and S4 are all the same in that the detection width increases slightly when there is an increase in the line number of the scan lines. This can be attributed to the following. When the height of the light source O, as shown in FIG. 3, is taken into account, the distance between the light source O and the distal end of the manipulation pen 4 is longer than the distance between the light source O and the upper part of the manipulation pen 4. Therefore, at the surface of the projection area 31, the detection width will be greater at the upper part of the manipulation pen 4, where the distance to the light source O is shorter. From near the scan line [N+1] to [N+7], the detection width in states S3 and S4 is greater than the detection width in state S0. That is, the greater is the inclination in the X axis direction from the normal line of the projection area 31, the greater will be the detection width at each scan line.

When the inclination of the manipulation pen 4 in the state S3 is calculated, the inclination determination component 213 acquires from the position specification component 212 the X coordinate detection position (P(t)) in FIG. 4) for every scan line in which the continuous detection duration is detected. Consequently, the inclination determination component 213 can acquire the scanning distance (X1-X0) in FIG. 5A. Thus, it is possible to calculate the inclination of the manipulation pen 4 in the X axis direction. That is, the inclination determination component 213 determines the inclination of the manipulation pen 4 in the main scanning direction according to the change rate in the above-mentioned X coordinate detection position with respect to the change in the plurality of scan lines projected on the same manipulation pen 4.

Also, in this embodiment the inclination determination component 213 determines the inclination of the manipulation pen 4 in the main scanning direction to be greater the larger is the above-mentioned change rate.

Similarly, the inclination determination component 213 can determine the inclination in the X axis direction of the manipulation pen 4 in the states S4 and S0.

Figure 6A:
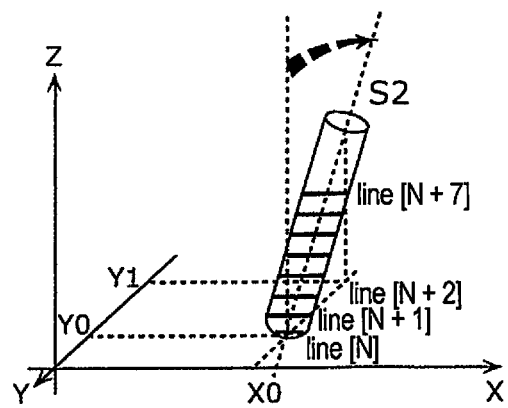
FIG. 6A is a diagram illustrating a state when a plurality of detection widths of the manipulation pen are detected in a state S2.
Figure 6B:
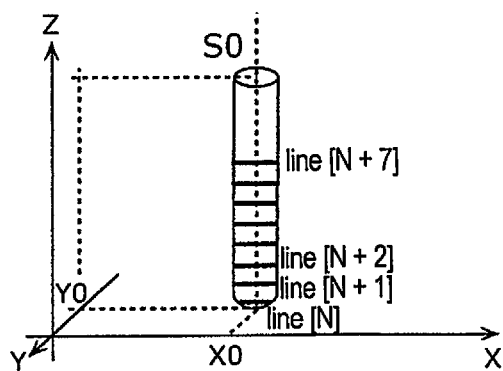
FIG. 6B is a diagram illustrating a state when a plurality of detection widths of the manipulation pen are detected in the state S0.
Figure 6C:
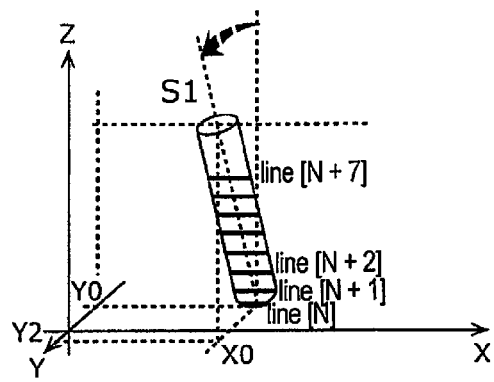
FIG. 6C is a diagram illustrating a state when a plurality of detection widths of the manipulation pen are detected in a state S1.

FIG. 6A is a diagram illustrating a state when the plurality of detection widths of the manipulation pen 4 are detected in the state S2. FIG. 6B is a diagram illustrating a state when the plurality of detection widths of the manipulation pen 4 are detected in the state S0. FIG. 6C is a diagram illustrating a state when the plurality of detection widths of the manipulation pen 4 are detected in the state S1. FIGS. 6A to 6C are views of the manipulation pen 4 from the light source O side, and illustrate how the scan lines [N] to [N+7] cross the manipulation pen 4 in a plurality of main scanning directions (horizontal directions).

As shown in FIGS. 6A to 6C, the continuous detection duration during which the photodetector 211 continuously detects the scattered light changes according to the inclination of the manipulation pen 4 in the Y axis direction. Consequently, the detection width obtained for each scan line varies. This can be attributed to the following. When the height of the light source O, as shown in FIG. 3, is taken into account, the size relation between the distance from the light source O to the distal end of the manipulation pen 4 and the distance from the light source O to the upper part of the manipulation pen 4 varies according to the inclination of the manipulation pen 4 in the Y axis direction. Also, the detection width will be greater the shorter is the distance between the light source and the various parts of the manipulation pen 4 at the surface of the projection area 31. That is, the distance between the light source O and the detected part of the manipulation pen 4 will vary for each scan line depending on the inclination of the manipulation pen 4 in the Y axis direction.

Figure 6D:
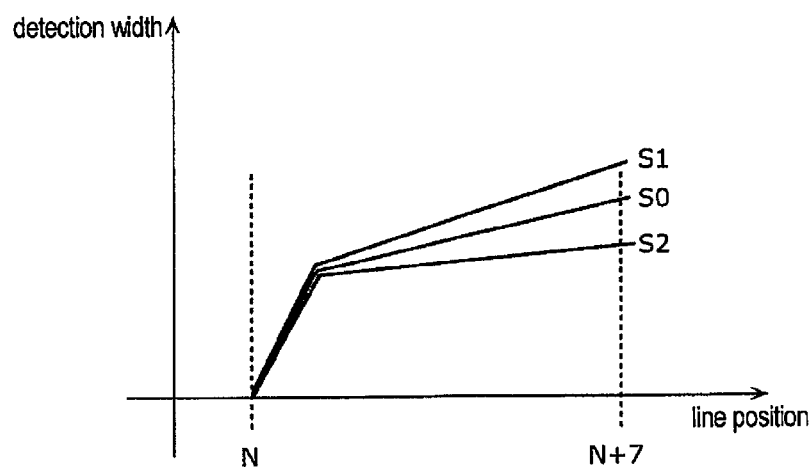
FIG. 6D is a graph illustrating changes in the detection widths in the states S0, S1, and S2.

FIG. 6D is a graph illustrating changes in the detection widths in the states S0, S1, and S2. In this graph, the horizontal axis indicates the position of the scan lines (e.g., line number), and the vertical axis indicates the detection width. In the illustrated embodiment, the manipulation pen 4 can have a shape that is pointed at the distal end, rather than being uniformly cylindrical. In this case, as shown in the graph in FIG. 6D, sharp inclination near the scan line [N] indicates a sudden change in the detection width from the distal end of the manipulation pen 4 to the main cylindrical part.

Meanwhile, from near the scan line [N+1] to [N+7], the states S0, S1, and S2 are all the same in that the detection width increases along with the line number of the scan lines. This can be attributed to the following. In all of the states S0, S1, and S2, the distance between the light source O and the distal end of the manipulation pen 4 is longer than the distance between the light source O and the uppermost part of the manipulation pen 4. Accordingly, at the surface of the projection area 31, the detection width is greater at the uppermost part of the manipulation pen 4 where the distance to the light source O is shorter. From near the scan line [N+1] to [N+7], the increase in the detection width in the state S0 is greater than that in the state S2, and greater in the state S1 than in the state S2, with respect to a positive change in the scan line (as the line number increasing). That is, the greater is the inclination in the negative direction of the Y axis direction from the normal line of the projection area 31, the greater will be the change rate in the detection width at each scan line.

When the inclination of the manipulation pen 4 in the state S1 is calculated, the inclination determination component 213 calculates the detection width at each scan line based on the detection signal of the photodetector 211. Consequently, the inclination determination component 213 can acquire the change rate in the detection width between the plurality of scan lines. Thus, it is possible to calculate the inclination of the manipulation pen 4 in the Y axis direction. That is, the inclination determination component 213 determines the inclination of the manipulation pen 4 in the sub-scanning direction according to the change rate in the detection width with respect to the change in the plurality of scan lines projected on the same manipulation pen 4.

Also, in this embodiment the inclination determination component 213 determines the inclination of the manipulation pen 4 in the sub-scanning direction to be greater the larger is the change rate in the detection width.

Similarly, the inclination determination component 213 can determine the inclination in the Y axis direction of the manipulation pen 4 in the states S2 and S0.

Figure 7:
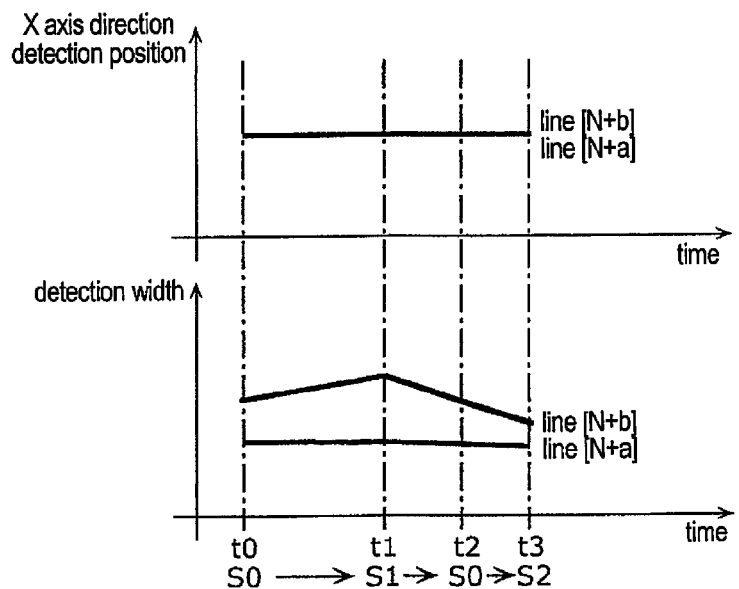
FIG. 7 is a graph illustrating changes in position information and width information when the inclination of the manipulation object is dynamically changed in a Y axis direction.

FIG. 7 is a graph illustrating changes in the position information and the width information when the inclination of the manipulation pen 4 is dynamically changed in the Y axis direction. FIG. 7 illustrates a graph of the temporal change in the detection width and the X coordinate detection position when the manipulation pen 4 is dynamically changed from the state S0 to the state S1, back to the state S0, and then to the state S2. Here, the scan line [N+a] is the scan line that scans the distal end of the manipulation pen 4, and the scan line [N+b] is the scan line that scans the upper part of the manipulation pen 4. In the case of the above-mentioned dynamic change, the manipulation pen 4 does not change in the X axis direction. Thus, the X coordinate detection position remains constant for both the scan lines [N+a] and [N+b]. On the other hand, if the manipulation pen 4 is inclined in the Y axis negative direction (i.e., from the state S0 to the state S1), then the detection width at the scan line [N+b] increases steadily, and if the manipulation pen 4 is inclined in the Y axis positive direction (i.e., from the state S1 to the state S2 via the state S0), then the detection width at the scan line [N+b] decreases steadily.

Figure 8:
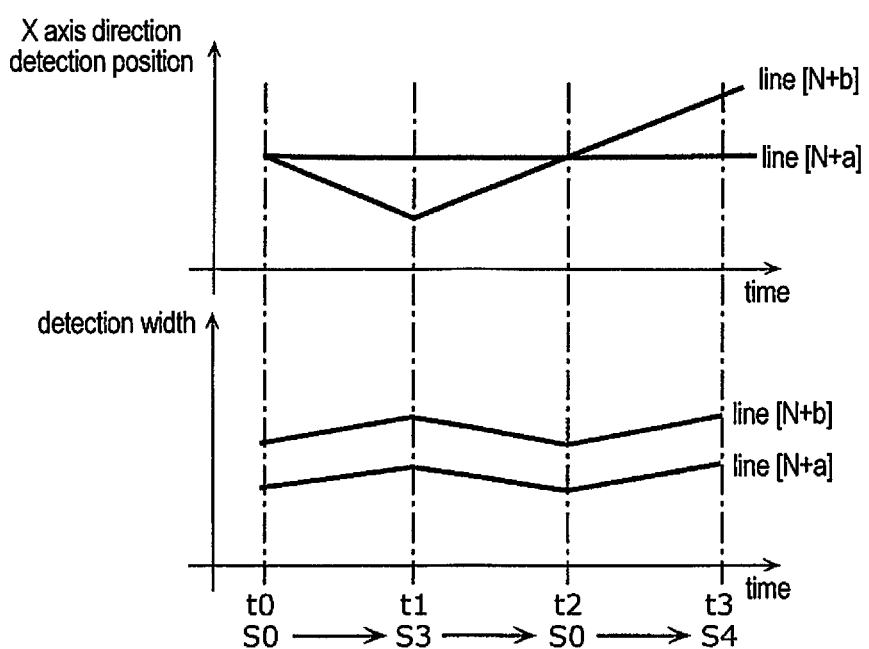
FIG. 8 is a graph illustrating changes in position information and width information when the inclination of the manipulation object is dynamically changed in an X axis direction.

FIG. 8 is a graph illustrating changes in the position information and the width information when the inclination of the manipulation pen 4 is dynamically changed in the X axis direction. FIG. 8 illustrates a graph of the temporal change in the detection width and the X coordinate detection position when the manipulation pen 4 is dynamically changed from the state S0 to the state S3, back to the state S0, and then to the state S4. In the case of the above-mentioned dynamic change, if the manipulation pen 4 is inclined in the X axis negative direction (i.e., from the state S0 to the state S3), then the X coordinate detection position at the scan line [N+b] decreases steadily. The detection width at the scan lines [N+a] and [N+b] increases steadily as the inclination angle increases. When the manipulation pen 4 is inclined in the X axis positive direction (i.e., from the state S3 to the state S4 via the state S0), then the X coordinate detection position at the scan line [N+b] increases steadily. The detection widths at the scan lines [N+a] and [N+b] increases or decreases along with the inclination angle.

As discussed above, even if the inclination of the manipulation pen 4 changes dynamically, because the light receiver 21 or the CPU 24 has already acquired characteristic data about the detection width and the X coordinate detection position with respect to the dynamic change as shown in FIGS. 7 and 8, the inclination determination component 213 is able to calculate the dynamic change in the inclination of the manipulation pen 4.

Effect

In order to acquire a plurality of sets of width information in the length direction of a manipulation object, a plurality of photodiodes with different light reception ranges in the height direction can be used for example. With the plurality of photodiodes, object detection can be performed, and the inclination of the manipulation object can be calculated based on the width information about the object detected by each of the photodiodes. In this case, however, the photodiodes must be disposed precisely, which makes the device configuration more complicated.

On the other hand, with the manipulation input device 2, the scattered light from the manipulation pen 4 (e.g., the manipulation object) can be detected in the projected image without the use of the plurality of light receiving elements. Furthermore, the plurality of sets of width information and the plurality of sets of position information corresponding to the various parts of the manipulation pen 4 can be acquired with a single light receiving element. Thus, user input manipulation using the inclination information about the manipulation pen 4 is possible without sacrificing user manipulation convenience and without making the device configuration more complicated.

Manipulation Input Method

The manipulation input method in accordance with the first embodiment of the present invention will now be described.

Figure 9:
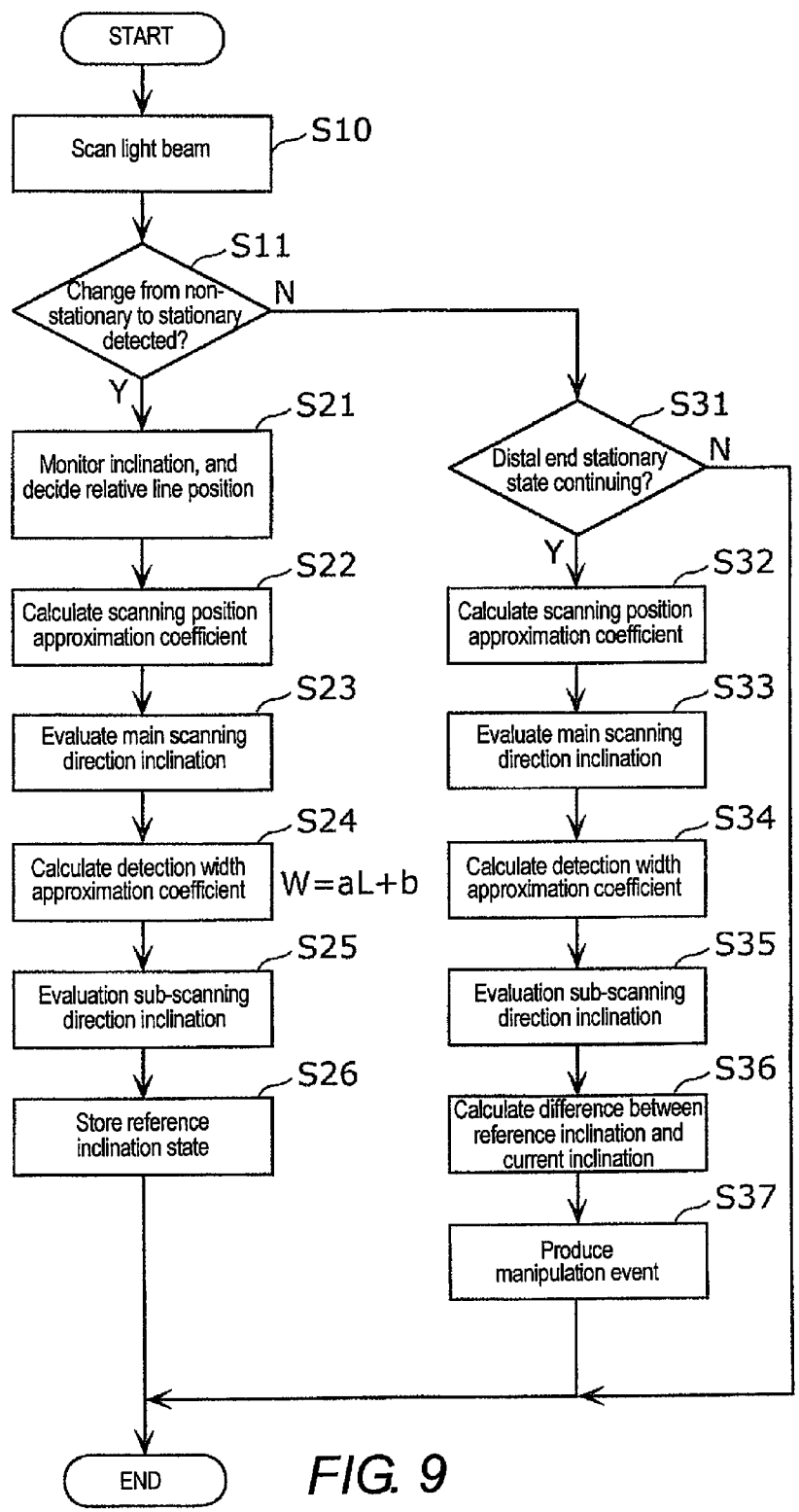
FIG. 9 is a flowchart illustrating a manipulation input method in accordance with the first embodiment.

FIG. 9 is a flowchart illustrating the manipulation input method in accordance with the first embodiment. The manipulation input method in accordance with this embodiment is a method for designating the display content to be outputted to the projection area 31 (e.g., the projection surface) or the control content of the computer by using the manipulation pen 4 (e.g., the manipulation object) to manipulate the desired position on the projection area 31 on which the image is displayed. More specifically, this manipulation input method involves detecting the static state of the manipulation pen 4 and storing the inclination state at that point. Then, a manipulation event is produced based on the amount of change relative to the stored inclination state.

First, the scanning projection component 22 deflects and scans the light beam and emits the projected light beam toward the projection area 31 (S10). Step S10 is a projection step in which the image is projected on the surface of the projection area 31 by scanning the light outputted by the laser light sources 226A, 226B, and 226C (e.g., the light sources) in the main scanning direction (horizontally) and the sub-scanning direction (vertically).

Next, the position specification component 212 of the light receiver 21 receives the scattered light from the manipulation pen 4 and determines whether or not the manipulation pen 4 is stationary (e.g., in the static state) (S11).

Next, in step S11, if the manipulation pen 4 is determined to be stationary (Yes in step S11), then the inclination determination component 213 decides on a plurality of scan lines of the projected light beam for determining the inclination of the manipulation pen 4 (S21).

Next, the inclination determination component 213 calculates a scanning position approximation coefficient indicating the relation between the scan line position (e.g., the line number) and the scanning position of the manipulation pen 4 detected by this scan line (S22). Step S22 includes a position specification step of specifying, for the plurality of scan lines, the position information about the manipulation pen 4 based on the scanning angle information for when the scattered light from the manipulation pen 4 is detected. For example, in the illustrated embodiment, in step S22, the scanning position approximation coefficient can be calculated by approximating the relation between the scan line position and the scanning position of the manipulation pen 4 using a linear function. Of course, the scanning position approximation coefficient can be calculated in a different manner.

Next, the inclination determination component 213 calculates the inclination of the scanned object (e.g., the manipulation pen 4) in the main scanning direction (e.g., the X axis direction) based on the above-mentioned scanning position approximation coefficient (S23). For example, in the illustrated embodiment, the inclination of the manipulation pen 4 in the X axis direction can be calculated based on the first derivative or slope of the linear function (step S22) indicative of the relation between the scan line position and the scanning position of the manipulation pen 4. In particular, the inclination determination component 213 can calculate the inclination of the manipulation pen 4 based on a predetermined table storing the relation between the inclination of the manipulation pen 4 and the slope of the linear function (step S22). Of course, the inclination of the manipulation pen 4 can be calculated in a different manner.

Next, the inclination determination component 213 calculates a detection width approximation coefficient indicating the relation between the scan line position (e.g., the line number) and the detection width detected by this scan line (S24). Step S24 is a width acquisition step of acquiring, for the plurality of scan lines, the width information about the manipulation pen 4 corresponding to the continuous detection duration during which the scattered light from the manipulation pen 4 is continuously detected. For example, in the illustrated embodiment, in step S24, the detection width approximation coefficient can be calculated by approximating the relation between the scan line position and the detection width of the manipulation pen 4 using a linear function (W=aL+b). Of course, the detection width approximation coefficient can be calculated in a different manner.

Next, the inclination determination component 213 calculates the inclination of the scanned object (e.g., the manipulation pen 4) in the sub-scanning direction (e.g., the Y axis direction) based on the above-mentioned detection width approximation coefficient (S25). For example, in the illustrated embodiment, the inclination of the manipulation pen 4 in the Y axis direction can be calculated based on the first derivative or slope of the linear function (step S24) indicative of the relation between the scan line position and the detection width of the manipulation pen 4. In particular, the inclination determination component 213 can calculate the inclination of the manipulation pen 4 based on a predetermined table storing the relation between the inclination of the manipulation pen 4 and the slope of the linear function (step S24). Of course, the inclination of the manipulation pen 4 can be calculated in a different manner.

Next, the CPU 24 acquires the inclination of the manipulation pen 4 in the main scanning direction and the sub-scanning direction from the inclination determination component 213, and stores this inclination as the reference inclination state of the manipulation pen 4 (S26).

Steps S23, S25, and S26 are static state storage steps in which the inclination of the manipulation pen 4 in the static state is determined based on the temporal change in the above-mentioned plurality of sets of position information and/or the temporal change in the above-mentioned plurality of sets of width information, and the inclination information about this static state is stored.

Next, if it is determined in step S11 that the manipulation pen 4 is not stationary (No in step S11), then the inclination determination component 213 determines whether or not the distal end of the manipulation pen 4 is stationary (S31).

Next, if it is determined in step S31 that the distal end of the manipulation pen 4 is stationary (Yes in step S31), then the inclination determination component 213 calculates the scanning position approximation coefficient indicating the relation between the scan line position (e.g., the line number) and the scanning position of the manipulation pen 4 detected by this scan line (S32). Step S32 includes a position specification step of specifying, for the plurality of scan lines, the position information about the manipulation pen 4 based on the scanning angle information for when the scattered light from the manipulation pen 4 is detected. For example, in the illustrated embodiment, in step S32, the scanning position approximation coefficient can be calculated in a manner same as the calculation in step S22.

Next, the inclination determination component 213 calculates the inclination of the scanned object (e.g., the manipulation pen 4) in the main scanning direction (e.g., the X axis direction) from the above-mentioned scanning position approximation coefficient (S33). For example, in the illustrated embodiment, in step S33, the inclination of the manipulation pen 4 can be calculated in a manner same as the calculation in step S23.

If it is determined in step S31 that the distal end of the manipulation pen 4 is not stationary (No in step S31), then the inclination determination component 213 ends calculation of the inclination of the manipulation pen 4.

Next, the inclination determination component 213 calculates a detection width approximation coefficient indicating the relation between the scan line position (e.g., the line number) and the detection width detected by this scan line (S34). Step S34 is a width acquisition step of acquiring, for the plurality of scan lines, the width information about the manipulation pen 4 corresponding to the continuous detection duration during which the scattered light from the manipulation pen 4 is continuously detected. For example, in the illustrated embodiment, in step S34, the detection width approximation coefficient can be calculated in a manner same as the calculation in step S24.

Next, the inclination determination component 213 calculates the inclination of the scanned object (e.g., the manipulation pen 4) in the sub-scanning direction (e.g., the Y axis direction) based on the above-mentioned detection width approximation coefficient (S35). For example, in the illustrated embodiment, in step S35, the inclination of the manipulation pen 4 can be calculated in a manner same as the calculation in step S25.

Next, the CPU 24 acquires the current inclination of the manipulation pen 4 in the main scanning direction and the sub-scanning direction from the inclination determination component 213, and calculates difference information about the inclination of the manipulation pen 4 based on the current inclination and the previously acquired reference inclination (S36). Step S36 is a difference information calculation step in which, if the inclination of the manipulation pen 4 is changing dynamically, then the inclination of the manipulation pen 4 in the dynamic state is determined based on the temporal change in the above-mentioned plurality of sets of position information and/or the temporal change in the above-mentioned plurality of sets of width information, and the difference information about the inclination of the manipulation object is calculated from the inclination information in this dynamic state and the inclination information in the static state.

Finally, the CPU 24 produces the manipulation event based on the difference information about the inclination of the manipulation pen 4 (S37). Step S37 is an input step of executing the above-mentioned control content or of displaying the above-mentioned display content, based on the inclination of the manipulation pen 4.

With the above manipulation input method, the inclination is detected independently for the main scanning direction and the sub-scanning direction. However, the manipulation event can be produced by combining the inclination in the above two directions by weighting, etc. Alternatively, it can be produced by employing just the direction with the greater amount of inclination. Furthermore, the configuration can be such that inclination information in the two directions is combined or selected according to the application.

Effect

With the above manipulation input method, the scattered light from the manipulation pen 4 (e.g., the manipulation object) can be detected in the projected image without using the plurality of light receiving elements. Furthermore, the plurality of sets of width information and the plurality of sets of position information corresponding to the various parts of the manipulation pen 4 can be acquired with a single light receiving element. Thus, the manipulation event using the inclination information about the manipulation pen 4 can be produced without sacrificing user manipulation convenience and without making the device configuration more complicated.

Second Embodiment

A manipulation input system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The manipulation input system in accordance with this embodiment includes the manipulation input device 2 (see FIG. 1) in accordance with the first embodiment, the manipulation pen 4 (see FIG. 1) that designates the position within the projection area 31 to be inputted, and the manipulation display board 3 on which the projection area 31 is displayed. The manipulation input device 2 calculates input coordinates of the manipulation pen 4 in the projection area 31 based on the scanning position of the manipulation pen 4 specified by the position specification component 212, and changes the size of the cursor or image to be displayed at these coordinates according to the inclination information determined by the inclination determination component 213.

For example, the larger is the inclination angle of the manipulation pen 4, the more the size of the cursor or image to be displayed in the projection area 31 is increased. On the other hand, the smaller is the inclination angle of the manipulation pen 4, the more the size of the cursor or image to be displayed in the projection area 31 is decreased. That is, this manipulation input system can be applied as a graphic tool that corresponds the inclination information of the manipulation pen 4 relative to the normal line of the projection area 31 to the thickness of the drawing lines.

Effect

With the manipulation input system in accordance with this embodiment, the inclination information about the manipulation pen 4 can be effectively used. Thus, this inclination information can be used to provide the user with an application that is more convenient.

The manipulation input device, the manipulation input system, and the manipulation input method in accordance with the embodiments are described above. However, the present invention is not limited to or by the above embodiments.

In the above embodiments, an example is given of the configuration of the scanning projection component 22 in which laser beams of three color components, namely, a red component (R), a green component (G), and a blue component (B), are combined, and this combined light is scanned by a scanning mirror to project and display a color image on the projection surface. However, the present invention can also be applied to various kinds of image display device that displays a color image by combining laser beams of different color components outputted from a plurality of laser light sources. Also, in the above embodiments, an example is given in which the combined light is in a state of white balance. However, it is clear from the above description that the present invention can also be applied to other specific color states.

Also, a laser light source is used as the light source in the above embodiments, but this is not the only option, and an LED (light emitting diode) light source or the like can be used, for example, as the light source.

Also, the drive controller, the position specification component 212, the inclination determination component 213, the CPU 24, and the manipulation component 25 forming the above-mentioned manipulation input device and the manipulation input system can more specifically be formed by a computer system made up of a microprocessor, a ROM, a RAM, a hard disk drive, a display unit, a keyboard, a mouse, and so forth. Computer programs can be stored in the RAM or on the hard disk drive. The microprocessor operates according to a computer program, so that the manipulation input device and the manipulation input system of the present invention achieve their function. The "computer program" here is made up of a combination of a plurality of command codes that give instructions to a computer in order to achieve a specific function.

Furthermore, these processors can be formed by a single system LSIC (large scale integrated circuit). A system LSIC is a super-multifunctional LSIC manufactured by integrating a plurality of components on a single chip, and more specifically is a computer system that includes a microprocessor, a ROM, a RAM, etc. Computer programs are stored in the RAM. The system LSIC achieves its function when the microprocessor operates according to a computer program.

These processors can also be formed by a single module or an IC card that can be inserted into and removed from the above-mentioned manipulation input device and the manipulation input system. This module or IC card is a computer system made up of a microprocessor, a ROM, a RAM, etc. The module or IC card can also include the above-mentioned super-multifunctional LSIC. When the microprocessor operates according to a computer program, the module or IC card achieves its function. This module or IC card can be tamper resistant.

Another aspect of the present invention is a manipulation input method. Specifically, the manipulation input method in accordance with the present invention is a manipulation input method for designating the display content to be outputted to a projection surface or the control content of a computer by using a manipulation object to manipulate the desired position on a projection surface on which an image is displayed, the method comprising a projection step of projecting the image on the projection surface by scanning light outputted by a light source, a detection step of detecting scattered light from the manipulation object when the manipulation object has moved into a specific detection range that includes the projection surface, a position specification step of specifying, for a plurality of scan lines, position information about the manipulation object based on scanning angle information for when the scattered light is detected in the detection step, a width acquisition step of acquiring, for the plurality of scan lines, width information about the manipulation object corresponding to a continuous detection duration during which the scattered light is continuously detected in the detection step, an inclination determination step of determining the inclination of the manipulation object based on a temporal change in the plurality of sets of position information determined in the position determination step and/or a temporal change in the plurality of sets of width information acquired in the width acquisition step, and an input step of executing the control content or displaying the display content based on the inclination of the manipulation object determined in the inclination determination step.

The present invention can also be a computer program with which the above-mentioned manipulation input method is carried out by a computer, or a digital signal formed of the above-mentioned computer program.

Furthermore, the present invention can be such that the above-mentioned computer program or the above-mentioned digital signal is recorded to a permanent recording medium that can be read by a computer, such as a flexible disk, a hard disk, a CD-ROM, an MO, a DVD, a DVD-ROM, a DVD-RAM, a BD (Blu-Ray™ Disc), or a semiconductor memory. It can also be the above-mentioned digital signal that is recorded to one of these permanent recording media.

The present invention can also be such that the above-mentioned computer program or the above-mentioned digital signal is transmitted via an electrical communications line, a wireless or wired communications line, a network (such as the Internet), data broadcast, etc.

The present invention can also be a computer system including a microprocessor and a memory, in which the memory stores the above-mentioned computer program, and the microprocessor operates according to the above-mentioned computer program.

Also, the present invention can be realized by another, independent computer system, if the above-mentioned program or the above-mentioned digital signal is recorded to one of the above-mentioned permanent recording media and transferred, or if the above-mentioned program or the above-mentioned digital signal is transferred via the above-mentioned network, etc.

The present invention can be applied to a projector or the like that projects onto a projection surface an image outputted by a personal computer, for example.

With one aspect of the present invention, a manipulation input device is provided that includes a projection component, a photodetector and an inclination determination component. The projection component is configured to project an image on a projection surface by scanning light from a light source. The photodetector is configured to detect as scattered light the light reflected by a manipulation object that has moved into a specific detection range including the projection surface. The inclination determination component is configured to acquire, for a plurality of scan lines of the light, position information of the manipulation object that is specified based on scanning angle information when the photodetector has detected the scattered light, and width information of the manipulation object that corresponds to a continuous detection duration during which the photodetector continuously detects the scattered light, the inclination determination component being further configured to determine inclination of the manipulation object based on at least one of a temporal change in a plurality of sets of the width information and a temporal change in a plurality of sets of the position information.

With this aspect, the scattered light from the manipulation object on the projection screen can be detected without using a plurality of light receiving elements. Furthermore, the plurality of sets of the width information and the plurality of sets of the position information corresponding to various parts of the manipulation object can be acquired. Thus, user input manipulation using inclination information about the manipulation object can be performed based on the plurality of sets of the width information and the plurality of sets of the position information, without sacrificing user manipulation convenience and without complicating the device configuration.

The manipulation input device in accordance with one aspect of the present invention can further includes a processor configured to produce a manipulation event based on the inclination of the manipulation object determined by the inclination determination component.

With this aspect, the manipulation event can be produced based on the inclination of the manipulation object. Thus, designating display content to be outputted to the projection surface or executing control content of a computer, for example, can be performed by using the manipulation object to manipulate a desired position on the projection surface on which the image is displayed.

With the manipulation input device in accordance with one aspect of the present invention, the projection component can be further configured project the image on the projection surface by alternately scanning the light in a main scanning direction that is perpendicular to a projection direction of the light, and in a sub-scanning direction that is perpendicular to the main scanning direction, and the inclination determination component can be further configured to determine the inclination of the manipulation object in the sub-scanning direction according to a change rate in the width information with respect to a change in the scan lines.

With this aspect, since the change rate in the width information over the plurality of the scan lines can be acquired, it is possible to calculate the inclination of the manipulation object in the sub-scanning direction.

With the manipulation input device in accordance with one aspect of the present invention, the inclination determination component can be further configured to determine the inclination of the manipulation object in the sub-scanning direction to be greater the larger is the change rate in the width information.

With the manipulation input device in accordance with one aspect of the present invention, the projection component can be further configured to project the image on the projection surface by alternately scanning the light in a main scanning direction that is perpendicular to a projection direction of the light, and in a sub-scanning direction that is perpendicular to the main scanning direction, and the inclination determination component is further configured to determine the inclination of the manipulation object in the main scanning direction according to a change rate in the position information with respect to a change in the scan lines.

With this aspect, since the change rate in the position information over the plurality of the scan lines can be acquired, it is possible to calculate the inclination of the manipulation object in the main scanning direction.

With the manipulation input device in accordance with one aspect of the present invention, the inclination determination component can be further configured to determine the inclination of the manipulation object in the main scanning direction to be greater the larger is the change rate in the position information.

Also, a manipulation input system in accordance with one aspect of the present invention includes the manipulation input device discussed above, the manipulation object configured to indicate an input position within the projection surface, and a manipulation display board on which the projection surface is displayed. The manipulation input device is further configured to change size of the image displayed at coordinates of the manipulation object on the projection surface according to the inclination of the manipulation object determined by the inclination determination component.

With this aspect, since the inclination information about the manipulation object can be effectively utilized, it is possible to provide an application that is more convenient to the user by using this inclination information.

Further, the present invention can be realized not only as the manipulation input device and the manipulation input system having characteristic processors as described above, but also as an inclination manipulation input method having characteristic steps that execute processings by the characteristic processors included in the manipulation input device and manipulation input system. The present invention can also be realized as a program for causing a computer to function as the characteristic processors included in the manipulation input device and manipulation input system, or a program that causes a computer to execute the characteristic steps included in the manipulation input method. It should also go without saying that this program can be distributed via a communications network such as the Internet, or a permanent recording medium that can be read by a computer, such as a CD-ROM (compact disc-read only memory).

With the manipulation input device in accordance with one aspect of the present invention, the scattered light from the manipulation object over the projected screen can be detected, and the plurality of sets of the width information and the plurality of sets of the position information corresponding to various parts of the manipulation object can be acquired, without using a plurality of light receiving elements. Thus, user input manipulation using inclination information about the manipulation object can be performed based on the plurality of sets of the width information and the plurality of sets of the position information, without sacrificing user manipulation convenience and without complicating the device configuration.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a manipulation input device in an upright position. Accordingly, these directional terms, as utilized to describe the manipulation input device should be interpreted relative to a manipulation input device in an upright position on a horizontal surface. Also, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A manipulation input device comprising:
 a projection component that projects an image on a projection surface by scanning light from a light source;
 a photodetector that detects as scattered light the light reflected by a manipulation object that has moved into a specific detection range including the projection surface; and
 an inclination determination component that acquires, for a plurality of scan lines of the light, a plurality of sets of position information of the manipulation object that is specified based on scanning angle information when the photodetector has detected the scattered light, respectively, and acquires, for the plurality of the scan lines, a plurality of sets of width information of the manipulation object that corresponds to a continuous detection duration during which the photodetector continuously detects the scattered light, respectively, the inclination determination component further determining inclination of the manipulation object with respect to a direction perpendicular to the projection surface based on at least one set of temporal changes in the plurality of sets of the width information for the plurality of the scan lines and temporal changes in the plurality of sets of the position information for the plurality of the scan lines.

2. The manipulation input device according to claim 1, further comprising a processor that produces a manipulation event based on the inclination of the manipulation object determined by the inclination determination component.

3. The manipulation input device according to claim 1, wherein the projection component further projects the image on the projection surface by alternately scanning the light in a main scanning direction that is perpendicular to a projection direction of the light, and in a sub-scanning direction that is perpendicular to the main scanning direction, and the inclination determination component further determines the inclination of the manipulation object in the sub-scanning direction according to a change rate in the width information with respect to a change in the scan lines.

4. The manipulation input device according to claim 3, wherein the inclination determination component further determines the inclination of the manipulation object in the sub-scanning direction to be greater the larger is the change rate in the width information.

5. The manipulation input device according to claim 1, wherein the projection component further projects the image on the projection surface by alternately scanning the light in a main scanning direction that is perpendicular to a projection direction of the light, and in a sub-scanning direction that is perpendicular to the main scanning direction, and the inclination determination component further determines the inclination of the manipulation object in the main scanning direction according to a change rate in the position information with respect to a change in the scan lines.

6. The manipulation input device according to claim 5, wherein the inclination determination component further determines the inclination of the manipulation object in the main scanning direction to be greater the larger is the change rate in the position information.

7. A manipulation input system comprising:

the manipulation input device according to claim 1;

the manipulation object that indicates an input position within the projection surface; and a manipulation display board on which the projection surface is displayed, the manipulation input device further changing size of the image displayed at coordinates of the manipulation object on the projection surface according to the inclination of the manipulation object determined by the inclination determination component.

8. A manipulation input method comprising:

projecting an image on a projection surface by scanning light from a light source;

detecting as scattered light the light reflected by a manipulation object that has moved into a specific detection range including the projection surface;

determining, for a plurality of scan lines of the light, a plurality of sets of position information of the manipulation object based on scanning angle information when the scattered light has been detected, respectively;

acquiring, for the plurality of the scan lines, a plurality of sets of width information of the manipulation object corresponding to a continuous detection duration during which the scattered light is continuously detected, respectively; and determining inclination of the manipulation object with respect to a direction perpendicular to the projection surface based on at least one set of temporal changes in the plurality of sets of the position information for the plurality of the scan lines and temporal changes in the plurality of sets of the width information for the plurality of the scan lines.

9. The manipulation input method according to claim 8, further comprising producing a manipulation event based on the inclination of the manipulation object.

10. A manipulation input method comprising:

projecting an image on a projection surface by scanning light from a light source;

detecting as scattered light the light reflected by a manipulation object that has moved into a specific detection range including the projection surface;

determining, for a plurality of scan lines of the light, position information of the manipulation object based on scanning angle information when the scattered light has been detected;

acquiring, for the plurality of the scan lines, width information of the manipulation object corresponding to a continuous detection duration during which the scattered light is continuously detected; and determining inclination of the manipulation object based on at least one of a temporal change in a plurality of sets of the position information and a temporal change in a plurality of sets of the width information, the determining of the inclination of the manipulation object further including determining the inclination of the manipulation object in a static state based on at least one of the temporal change in the plurality of sets of the position information and the temporal change in the plurality of sets of the width information, storing inclination information indicating the inclination of the manipulation object in the static state, determining the inclination of the manipulation object in a dynamic state based on at least one of the temporal change in the plurality of sets of the position information and the temporal change in the plurality of sets of the width information while the inclination of the manipulation object changes dynamically, and calculating difference information of the inclination of the manipulation object based on inclination information indicating the inclination of the manipulation object in the dynamic state and the inclination information in the static state, and the producing of the manipulation event further including producing the manipulation event based on the difference information.

\* \* \* \* \*